R. N. GRAVERT.
GRINDER ATTACHMENT FOR MEAT CHOPPERS.
APPLICATION FILED JULY 15, 1916.
1,275,245.          Patented Aug. 13, 1918.
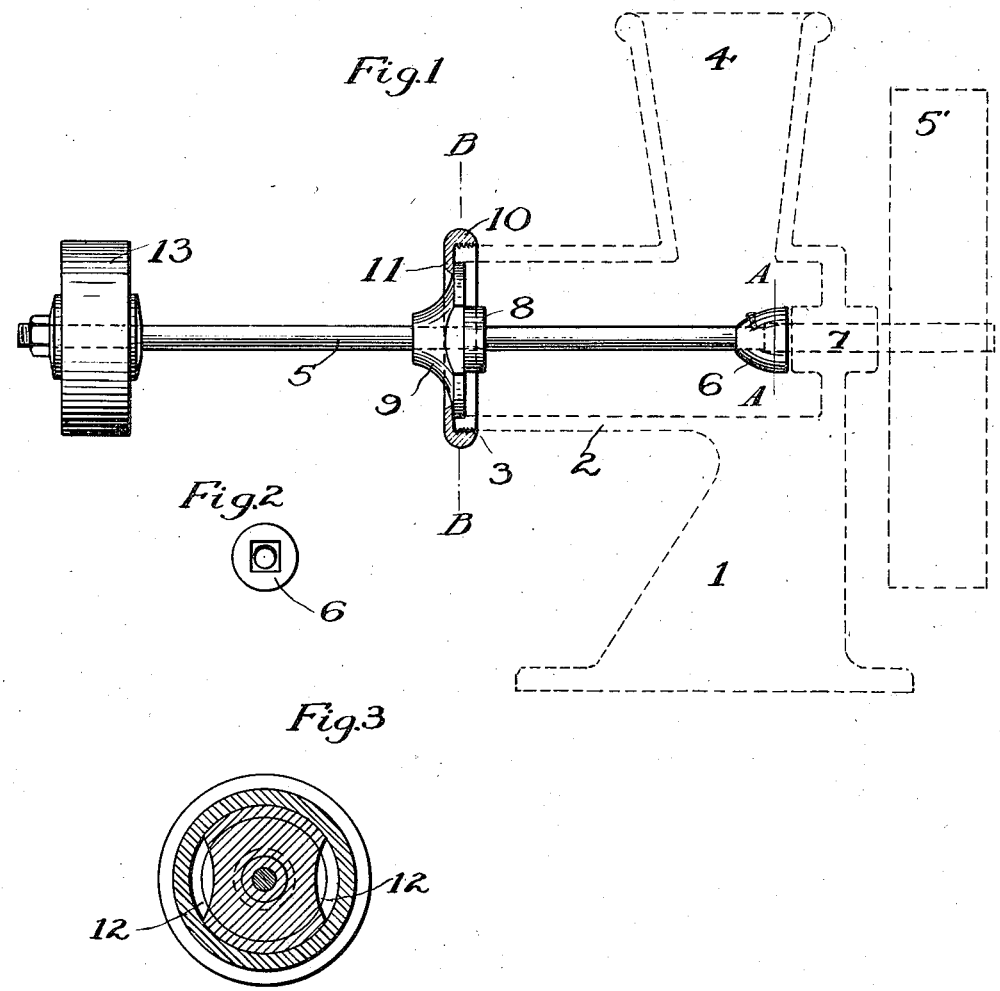
Inventor:
Reimer N. Gravert.
by C. D. Enochs
Attorney.

UNITED STATES PATENT OFFICE.

REIMER N. GRAVERT, OF MINNEAPOLIS, MINNESOTA, ASSIGNOR OF FORTY-NINE ONE-HUNDREDTHS TO ROXIE TREMONT, OF MINNEAPOLIS, MINNESOTA.

GRINDER ATTACHMENT FOR MEAT-CHOPPERS.

1,275,245.  Specification of Letters Patent.  Patented Aug. 13, 1918.

Application filed July 15, 1916. Serial No. 109,578.

*To all whom it may concern:*

Be it known that I, REIMER N. GRAVERT, a citizen of the United States, and a resident of Minneapolis, in the county of Hennepin and State of Minnesota, have invented certain new and useful Improvements in Grinder Attachments for Meat-Choppers, of which the following is a specification.

One object of my invention is to provide means for joining a shaft of the attachment to a shaft of the meat chopper.

Another object of my invention is to provide an outboard bearing for the shaft of the grinder attachment.

Another object of my invention is to provide means for readily joining the attachment to the meat chopper and prevent end play of the shaft and also provide a closure for the end of the meat chopper.

With these and incidental objects in view, the invention consists of certain novel features of construction and combination of parts, the essential elements of which are hereinafter described with reference to the drawing which accompanies and forms a part of this specification.

In the drawing, Figure 1 is a side elevation partly in section showing my improved attachment applied to a meat chopper of common type.

Fig. 2 is a section taken on the line AA, Fig. 1, and Fig. 3 is a section taken on the line BB, Fig. 1.

Carried by the base 1, the meat chopper disclosed in Fig. 1 has a barrel 2 at the end 3 of which the cutting plate and knives would be assembled in a manner well known to those skilled in the art.

A hopper 4 provides means for feeding the chopper and the pulley 5' is provided for driving the chopping shaft and knife, not shown.

The shaft 5 carries a coupling 6 one end thereof having a squared hole in its outermost extremity as plainly shown in Fig. 2 adapted to receive the squared end of the shaft 7.

An end thrust collar 8 is suitably fastened to the shaft 5 and the flange bearing 9 is journaled on the shaft 5.

A cap 10 is provided for closing the end of the barrel 2 by thread engagement and has an annular flange 11 of smaller inner diameter than the inner diameter of the barrel 2.

The flange 9 has a portion thereof cut away at 12, as plainly shown in Fig. 3 so that the cap 10 may be slipped over the coupling 6 and the bearing flange 9 in assembling the attachment with the chopper.

The cap having been slipped over the flange bearing, and the coupling 6 having been fitted to the squared shaft 7, the cap 10 is screwed home on the barrel 2 thus, with the end thrust collar 8 and the coupling 6, positioning the shaft 5 longitudinally.

The shaft 5, which now runs freely in the bearing 9, carries on its outermost end an abrasive wheel 13 attached to the shaft in any suitable manner.

While I have described my invention and illustrated it in one particular design, I do not wish it understood that I limit myself to this construction, as it is evident that the application of my invention may be varied in many ways within the scope of the following claims.

Claims:

1. In a grinding attachment for a meat chopper having a hollow barrel and a shaft the combination of a grinding shaft, a coupling fastened at one end of said grinding shaft and having fastening means for engagement with said first named shaft, an end thrust collar carried by said grinding shaft, a cap for the end of said hollow barrel having a centrally located aperture therein smaller than the inside diameter of said barrel, and a flanged bearing having a diameter greater in one direction than in the direction 90 degrees therefrom so that said cap may, by tipping it angularly in respect to said shaft, be slipped over said flanged bearing and by screw engagement on said barrel position the end thrust collar carried by said grinding shaft.

2. In a grinding attachment for a meat chopper the combination, of a grinding shaft having means for engagement with the chopper shaft, a cap for the barrel of said chopper adapted to engage therewith by screw connection, and an end thrust collar carried by said grinding shaft and adapted to bear on the inner side of said cap to prevent the movement of said grinding shaft longitudinally.

REIMER N. GRAVERT.